United States Patent [19]

Keller

[11] Patent Number: 5,006,712

[45] Date of Patent: Apr. 9, 1991

[54] CATOPTRIC DIFFERENTIAL SENSING DEVICE

[75] Inventor: Hans J. Keller, Staefe, Switzerland

[73] Assignee: Eltec Instruments, Inc., Daytona Beach, Fla.

[21] Appl. No.: 105,896

[22] Filed: Oct. 8, 1987

[51] Int. Cl.$^5$ .............................................. G01J 5/08
[52] U.S. Cl. .................................. 250/353; 250/342; 340/567; 340/600
[58] Field of Search ................ 340/600, 567; 250/353, 250/342

[56] References Cited

U.S. PATENT DOCUMENTS

| | | | |
|---|---|---|---|
| 3,271,575 | 9/1966 | Falbel | 250/216 |
| 3,413,468 | 11/1968 | Astheimer | 250/338 |
| 4,087,688 | 5/1978 | Keller | 250/342 |
| 4,670,655 | 6/1987 | Zierhut | 250/342 |

*Primary Examiner*—Constantine Hannaher
*Attorney, Agent, or Firm*—Duckworth, Allen, Dyer & Doppelt

[57] ABSTRACT

A radiation detector comprising a first pair of flat reflective surfaces parallel to one another and connected by a second pair of flat rectangular reflective surfaces converging toward one another so as to form a reflective chamber having a relatively wide opening for the entrance of radiation and a relatively narrow opening defining a region for receiving radiaiton, there being a radiation sensor positioned in the receiving region for detecting fluctuations in levels of radiation received from a plurality of detection zones.

3 Claims, 4 Drawing Sheets

CATOPTRIC DIFFERENTIAL SENSING DEVICE

FIELD OF THE INVENTION

This invention relates to a radiation detector for sensing fluctuations in low levels of infrared radiation.

BACKGROUND OF THE INVENTION

In the past numerous optic and catoptric arrangements have been developed for channelling low level radiation to electro-optic sensors for detection purposes. Such devices have been used for detecting motion based on sensing changes in infrared radiation levels at intensities which are very near background levels. Typical catoptric detection devices used in the past are those described in U.S. Pat. Nos. 3,271,575 to Falbel; 3,413,468 to Astheimer; and 4,087,688 to Keller. By way of example, among the devices known in the prior art, there has been disclosed an internal reflecting truncated cone for maximizing the gain in infrared signals provided through the wide opening of the cone to a single immersed detector located beyond the truncated cone end. The maximum possible gain achievable with the internally reflective cone is only comparable to an f/0.5 optical system thus necessitating the positioning of a conical plug having a high refractive index between the truncated cone end and the sensor to further condense radiation which would otherwise be reflected back out the wide end of the cone.

Some of the prior catoptric devices reflect radiation from a continuous field of detection to the sensor. However, it has also been found advantageous to divide an optical field into an alternating pattern of detection zones and passive, i.e., dark zones, in order to more reliably detect minor fluctuations in radiation levels corresponding to the slightest motion of a body through the field. Keller discloses the use of a simple collecting lens in combination with a reflective tube for focusing direct and reflected radiation upon a radiation sensor. The combination, which has been useful in burglary alarm systems, divides an optical field into a plurality of isolated detection zones each separated by a dark zone. During movement of a radiation source through one or a number of the detection zones, the corresponding level of radiation transmitted to the sensor will vary significantly from the background level. In response, the electrical signal provided by the sensor to either a conventional pulse detector or an alternating current voltage detector will also fluctuate resulting in an alarm status.

Generally, motion detection devices known in the prior art are of a complex design, or require expensive lenses, or are physically large. Furthermore, such prior art systems have been difficult to provide adequate numbers of zones of coverage and to eliminate large dark areas. Often, focusing problems are experienced with lenses.

SUMMARY OF THE INVENTION

Among the several objects of the invention may be noted the provision of an improved catoptric system for detecting movement in an optical field which overcomes the above discussed disadvantages, limitations or undesirable features, as well as others, of the prior art; such catoptric system providing an improved signal to noise ratio and improving the reliability of motion detection; the provisions of such system including a means for providing suitable optical signal levels for radiation received from each of a plurality of detection zones so that a differential, dual detector may reliably discriminate low level fluctuations in optical intensity due to movement from normal background intensity fluctuations over a wide field of view.

Generally, there is provided an improved catoptric system which includes a pair of parallel reflective surfaces which direct radiation from a number of discrete detection zones to a receiver wherein each zone intersects an optical axis passing between the reflective surfaces at a predetermined angle. The system includes a second pair of flat, rectangular reflective surfaces connecting each of the first parallel reflective surfaces to one another so as to form a reflective chamber having a relatively wide opening for radiation to enter and a relatively narrow opening defining a region for receiving radiation. The reflective chamber intensifies the radiation transmitted to a differential sensor in the receiving region by multiple imaging. The sensor comprises a pair of spatially separated sensing elements or detectors which generate opposite voltage responses when excited with radiation. A body moving through the zones of detection will sequentially transmit radiation first to one of the detectors, next to both detectors and then only to the second detector, resulting in an alternating pattern of electrical responses.

DETAILED DESCRIPTION OF THE PREFERRED EMBODIMENT

Figure 1:
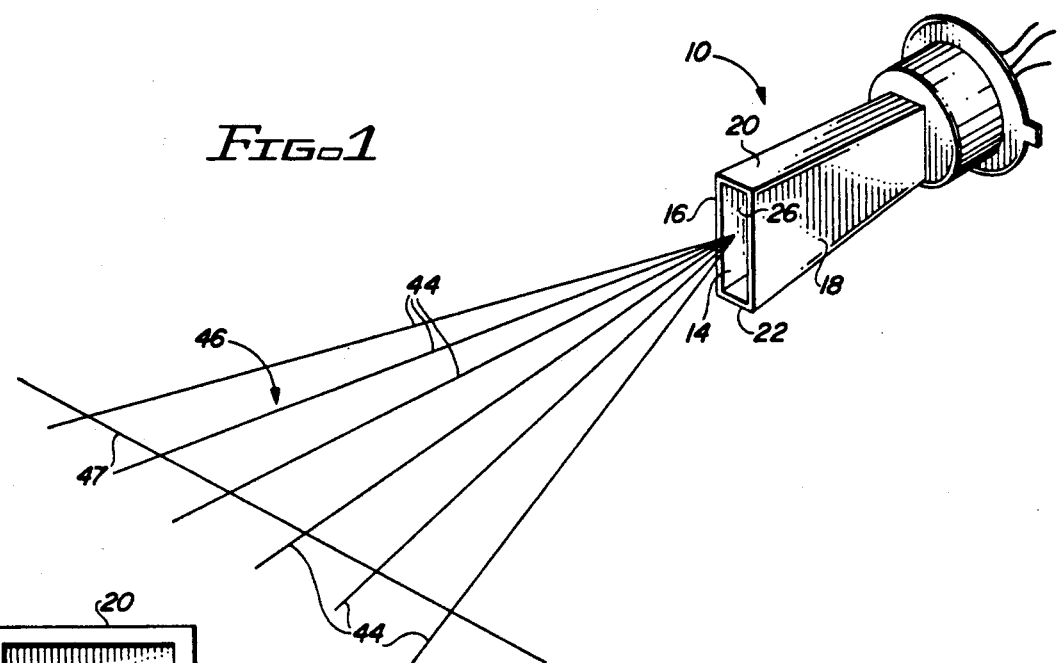
FIG. 1 is a perspective view of the inventive detection device.
Figure 2:
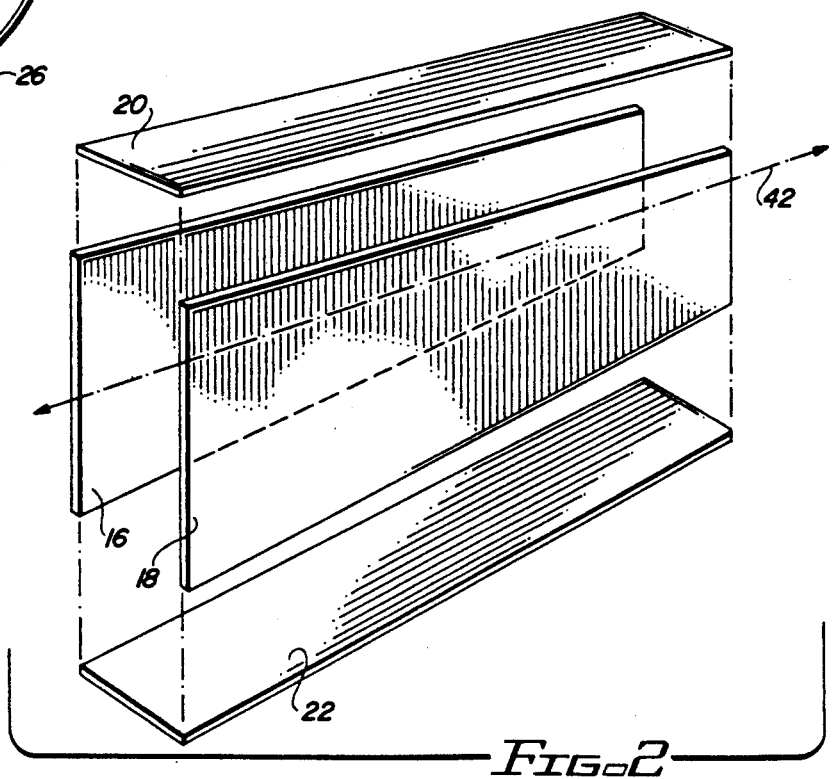
FIG. 2 is an exploded perspective illustration of the geometric arrangement of parallel and converging pairs of flat, rectangular mirrored surfaces in the catoptric portion of the detection device.

With reference to FIGS. 1 and 2 there is illustrated a catoptric detection system 10 comprising a reflective chamber 14 formed by a first pair of flat, reflective trapezoidal surfaces 16 and 18 and a second pair of flat reflective rectangular surfaces 20, 22. Reflective surfaces 16 and 18 are parallel plates each facing the other and having complimentary wedge-like shapes. Surfaces 16 and 18 are connected to one another by surfaces 20 and 22 resulting in chamber 14 having a wide opening 26 at one end for the entrance of radiation and a relatively narrow opening forming region 30, illustrated in FIG. 3, for positioning an electro-optic sensor 32.

In a preferred embodiment of the invention as illustrated in the figures generally, surfaces 16 and 18 lie in vertical planes equidistant from an optical axis 42 in order to form a prism surface for reflecting radiation received from a plurality of exemplary zones 44 arranged in a primary horizontal plane 46. Each zone 44 extends along a central angle formed with optical axis 42 at a central point 48 in region 30. Surfaces 16 and 18 reflect the horizontal zone pattern arranged along line 47 of FIG. 1 to optical device 32. By way of example, radiation received from a zone centered at 10 degrees from the optical axis in the horizontal plane undergoes the single reflection illustrated in FIG. 4 in order to arrive at central point 48. Radiation received at central point 48 from other detection zones (not illustrated) undergoes multiple reflections between the parallel surfaces. In the past this catoptric arrangement for defining a plurality of detection zones along a primary horizontal plane has not in and of itself been useful for motion detection because of the relatively low signal to noise ratio of the radiation or when used in conjunction with the focusing optics due to poor imaging quality at large angles of incidence. However, it is believed that the inventive detection system 10 overcomes this limitation by the provision of the second pair of reflective surfaces 20 and 22, which reflect additional radiation from each detection zone into region 20. By way of example, provision of supplemental radiation to region 30 is illustrated in FIG. 5 for a simple case wherein radiation is transmitted into chamber 14 in a vertical plane passing through optical axis 42. Radiation undergoing a single reflection at point 48 is transmitted through region 30. Similarly radiation undergoing reflections at points 50 and 52 is transmitted into the receiving region 30. Radiation transmitted through the plurality of detection zones may be multiply reflected from surfaces 16, 18, 20 and 22. As a result, the inventive detection system provides a substantial increase in the level of signals provided from each discrete detection zone.

Figure 3:
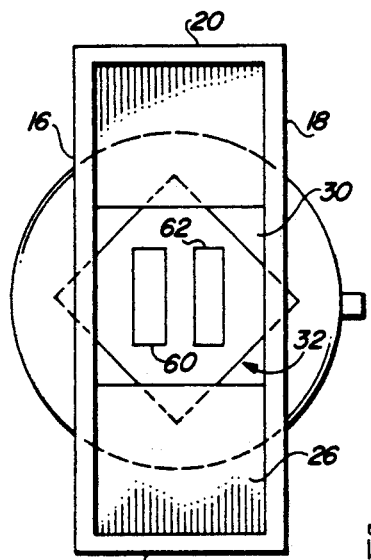
FIG. 3 is a front view of the detection system illustrating the orientation of dual detectors.

In the preferred embodiment, sensor 32 is a differential dual detector comprising a pair of crystals 60, 62 as illustrated in FIG. 3. While reference is made to "crystals" which may be, for example, lithium tantalate, it will be recognized that various types of detectors such as ceramic, PVF plastic and other elements are substitute for such crystals. The crystals are aligned vertically with respect to the primary horizontal plane 46 and are equidistant from optical axis 42 and extend equidistantly on opposite sides of plane 46. The alignment of crystals 60 and 62 is symmetrical with alignment of mirrored surfaces 16 and 18 and 20 and 22. Because crystals 60 and 62 are spaced apart, they each receive radiation from different, but overlapping, sub-zones adjacent each of the plurality of zones illustrated in FIG. 4. As a result, motion in the primary horizontal plane and through the plurality of zones will result in varying output signals from each crystal.

Figure 6:
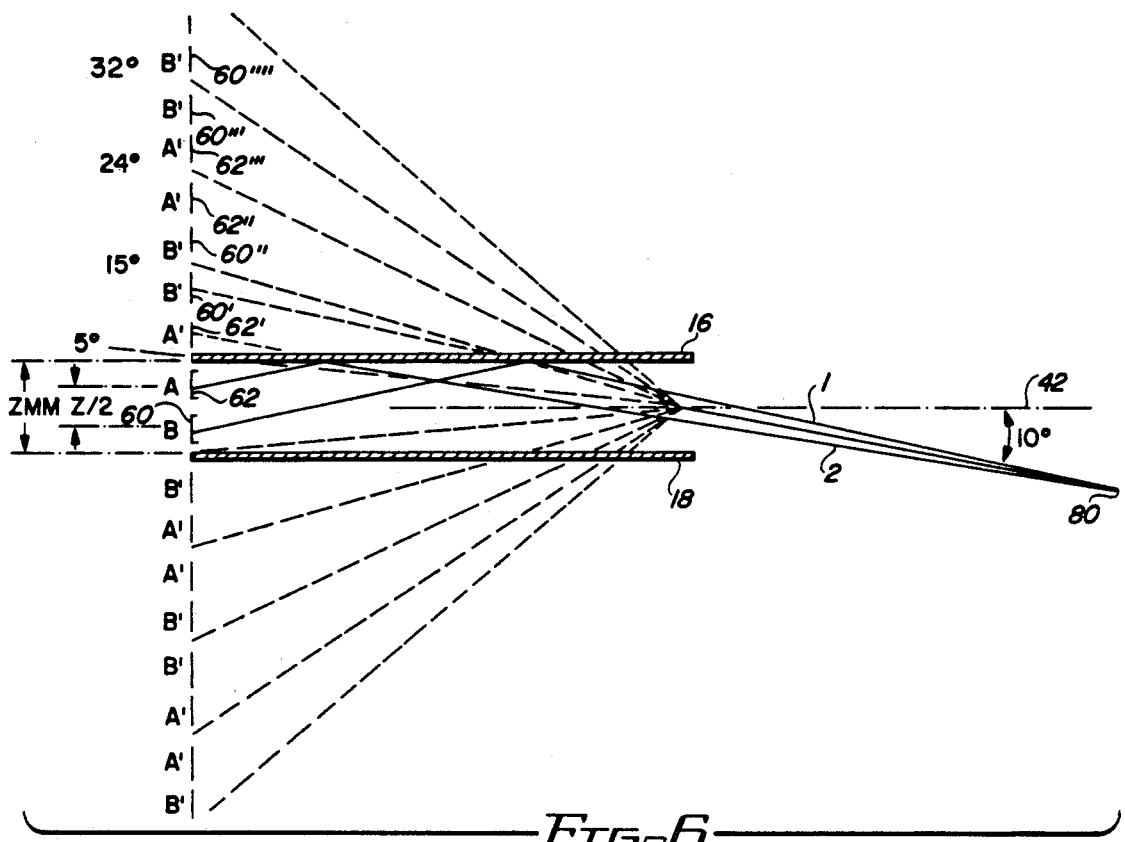
FIGS. 6–9 illustrate various reflection patterns associated with detection of motion by the differential detector arrangement of the inventive device.

By way of example, operation of the dual detector system is illustrated in FIGS. 6–9 using the method of images. In a cavity 14 having parallel reflective surfaces 16 and 18 spaced a distance Z apart, the centers of crystals 60 and 62 are separated by the distance Z/2. It is assumed in this example that crystal 60 produces a negative voltage response and crystal 62 produces a positive voltage response. Singly reflected images of crystals 60 and 62 are denoted by 60' and 62' respectively. Higher order images of each crystal are denoted with a corresponding greater number of primes following the reference number. The images lie in a vertical plane transverse to optical axis 42. Images formed in the primary horizontal plane 46 are illustrated in FIG. 6 while other images reflected from surfaces 20 and 22 are not shown.

Figure 4:
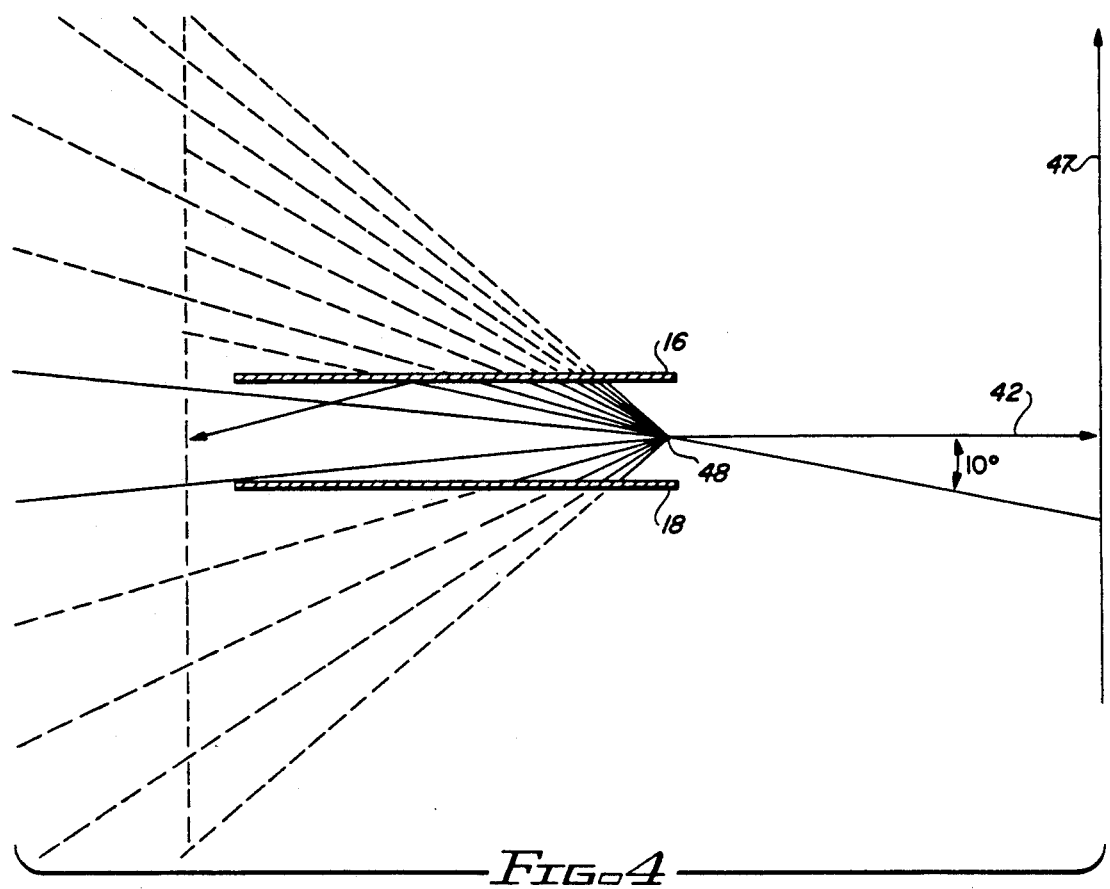
FIG. 4 illustrates a pattern of detection zones produced by parallel mirrored surfaces in the inventive detection system.
Figure 5:
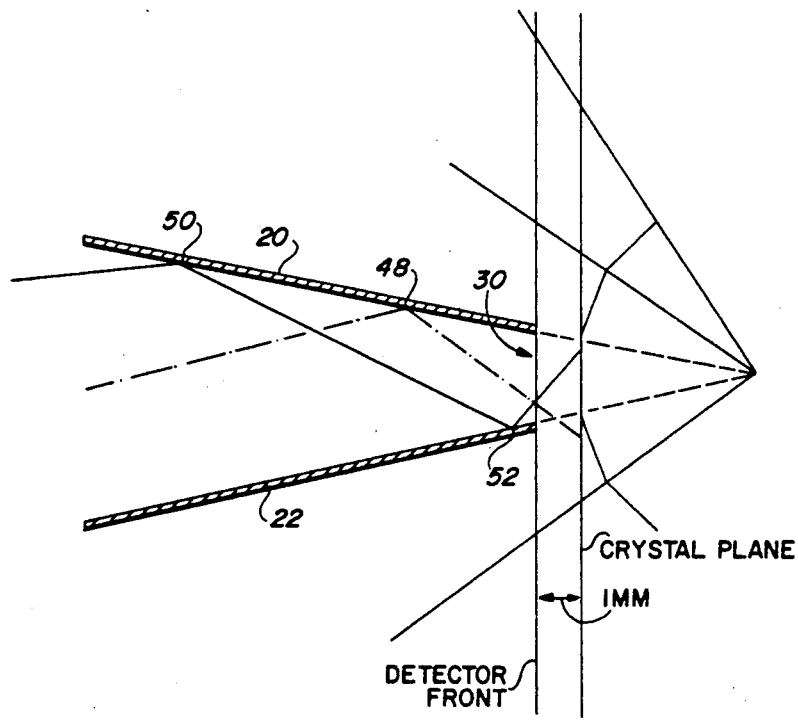
FIG. 5 illustrates reflective patterns from a pair of non-parallel mirrored surfaces in the detection system.

The aforedescribed 10 degree zone of FIG. 4 has a width ranging from 5 degrees to 15 degrees. Image 60' is in a subzone centered at 7½ degrees and image 62' is in a subzone centered at 12½ degrees. Similarly, the zone centered at 20 degrees has a width ranging from 15 degrees to 25 degrees with image 62" in a subzone centered at 17½ degrees and image 60" in a subzone centered at 22½ degrees.

Figure 7:
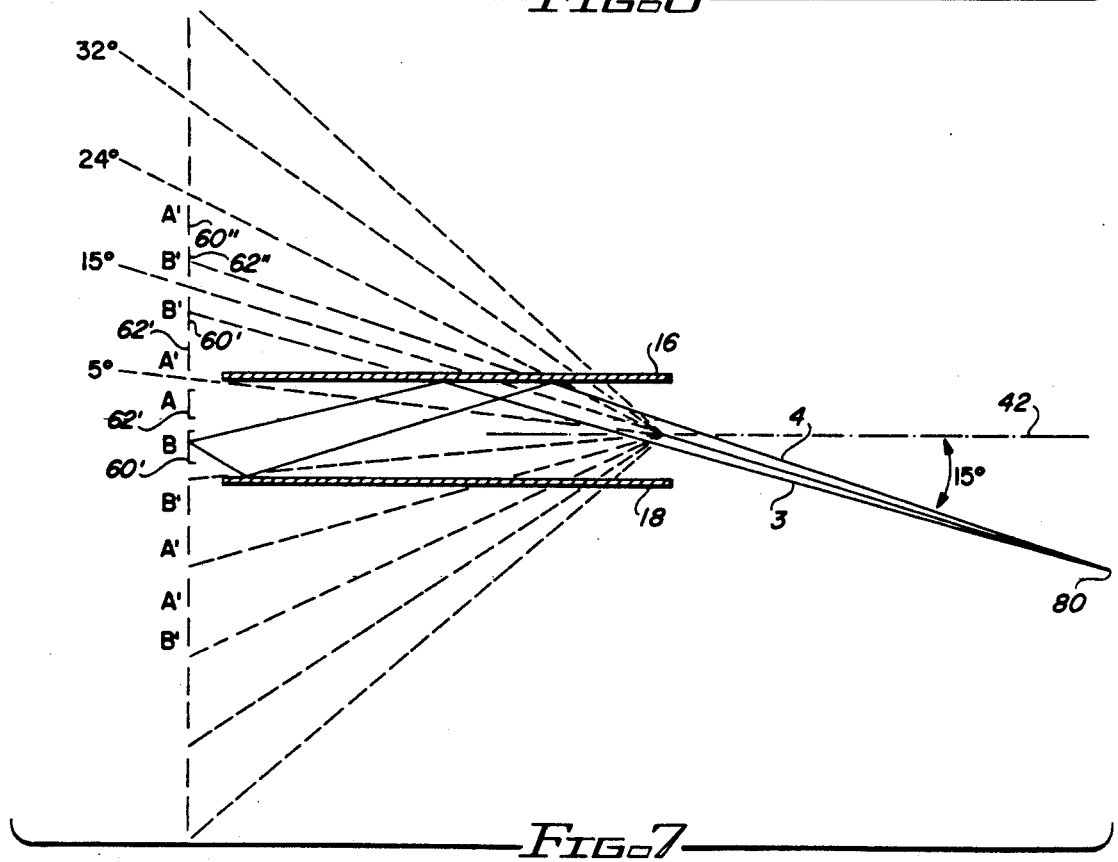
Figure 8:
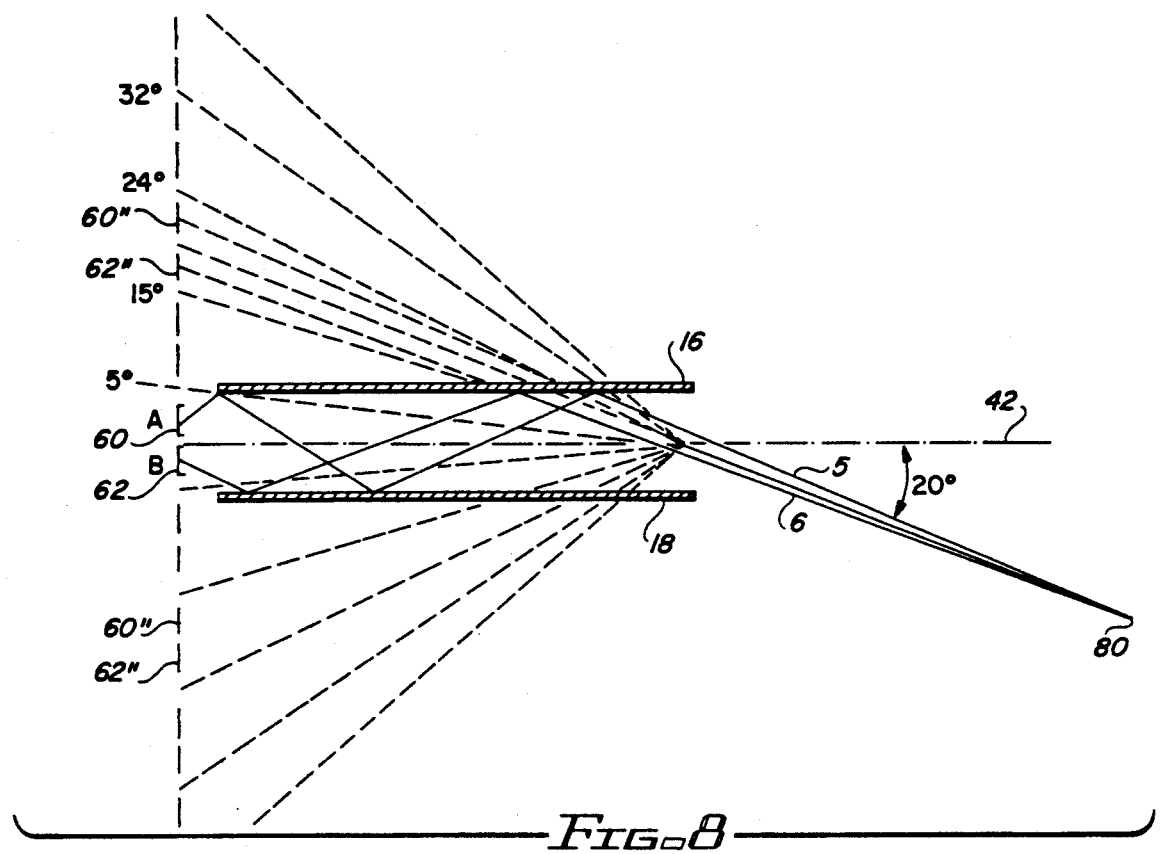
Figure 9:
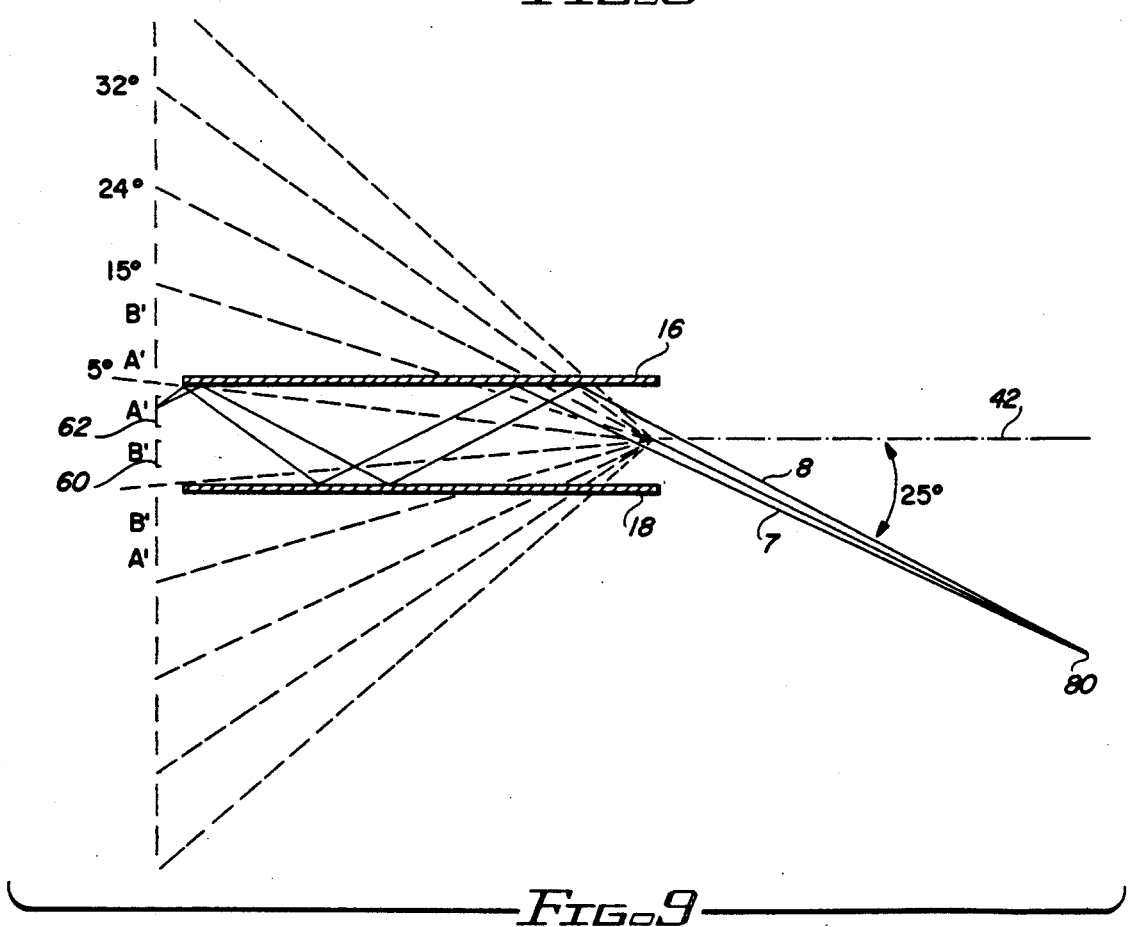

As illustrated in FIG. 6 the image of object 80, centered at 10 degrees from optical axis 42 in the horizontal plane 46 of the optical field, will be reflected to crystal 60 along path 1 and to crystal 62 along path 2. The crystals respond with equal but opposite voltage responses which cancel out. Referring next to FIG. 7 wherein the object 80 has moved to a position centered at 15 degrees from the optical axis 42 in the horizontal plane 46 of the optical field, first and second images of object 80 will be reflected to crystal 60 along paths 3 and 4 while no image will be reflected to crystal 62. Since radiation reaches the sensing element along two paths, there is an optical gain of 2 resulting from this arrangement. A net negative response generated by crystal 60 provides an alarm signal. FIG. 8 illustrates object 80 centered at 20 degrees from the optical axis 42 with its image being reflected to crystal 60 along path 5 and to crystal 62 along path 6, there being no net voltage response from the crystals. With object 80 centered at 25 degrees as illustrated in FIG. 9, images will be reflected to crystal 62 along paths 7 and 8, but no image will be received by crystal 60. The net positive response generated by crystal 62 provides an alarm signal.

It can be seen that with the differential dual detector a series of detection zones occur at 5, 15, 25 and 35 degrees on either side of optical axis 42 while a series of dead zones exist at 10, 20 and 30 degrees on both sides of optical axis 42. The signal response in each of the detection zones is magnified by the additional images reflected to sensor 32 by surfaces 20 and 22 which increases the optical gain by another factor of typically 3 to 6, resulting in a total optical gain of two times 3 to 6 or a gain of 6 to 12. For example the same optical performance can be achieved by making the described truncated cone from a piece of solid radiation transmissive material, wherein some of the surfaces may be provided with reflected coatings and, if required, some other with anti-reflective coatings. The meaning of this is that the whole cone channel arrangement could, instead of a hollow configuration with internal reflective surfaces, be made from an infrared transmissive material with reflective coatings on the outside.

A novel catoptric device has been presented for detecting movement in an optical field. It is contemplated that changes in the components and arrangement of components in the novel device may be made by those having ordinary skill in the art without departing from the spirit of the invention or the scope of the invention as set forth in the claims which follow.

I claim:

1. Apparatus for detecting fluctuations in radiation transmitted through a plurality of spaced apart detection zones arranged in a primary plane, the primary plane passing through a region for receiving radiation from each of the detection zones, said apparatus comprising:
   a. sensing means positioned in the receiving region for detecting fluctuations in levels of radiation transmitted to the receiving region;
   b. first reflective means for transmitting radiation from each detection zone to said sensing means through a plurality of reflective paths in the primary plane; said first reflective means comprising two substantially parallel opposing planar reflective surfaces each transversely intersecting the primary plane; and c. second reflective mans optically coupled to said first reflective means for transmitting radiation from each detection zone to said sensing means through a plurality of reflective paths extending outside the primary plane; said second reflective means comprising two convergent and opposing reflective surfaces, each convergent surface being substantially planar and transverse to said parallel reflective surfaces.

2. The apparatus of claim 1 wherein said sensing means comprises at least two spaced apart sensors for differential detection of radiation levels in at least two portions of said receiving region.

3. An improved catoptic system for detecting movement of a body in an optical field, comprising:

an electro-optic sensor comprising a pair of spatially separated detectors which generate opposite voltage responses when excited by incident radiation;

a pair of spaced parallel trapezoidal first reflective surfaces;

a pair of spaced flat, rectangular second reflective surfaces respectively connecting each of said first reflective surfaces;

said connected first and second reflective surfaces defining a chamber having a relatively wide opening at one end for entrance of radiation from a plurality of detection zones arranged in a primary plane, and a relatively narrow opening at another end for delivering said radiation from said plurality of zones to said electro-optic sensor after reflection by said first and second surfaces; and said sensor and surfaces being relatively dimensioned, configured and arranged so that a body moving through the detection zones will sequentially transmit radiation first to one detector, then to both detectors, then to the other detector, resulting in an alternating pattern of electrical responses.

* * * * *